United States Patent [19]
Watanabe

[11] Patent Number: 4,622,563
[45] Date of Patent: Nov. 11, 1986

[54] PRINTING APPARATUS WITH MULTIPLE RIBBON CASSETTES HOLDER

[75] Inventor: Junji Watanabe, Yokohama, Japan

[73] Assignee: Kabushiki Kaisha Toshiba, Kawasaki, Japan

[21] Appl. No.: 627,298

[22] Filed: Jul. 2, 1984

[30] Foreign Application Priority Data

| | | | |
|---|---|---|---|
| Jul. 5, 1983 | [JP] | Japan | 58-121774 |
| Jul. 15, 1983 | [JP] | Japan | 58-128921 |
| Jul. 18, 1983 | [JP] | Japan | 58-130512 |

[51] Int. Cl.[4] .......... G01D 15/10
[52] U.S. Cl. .......... 346/76 PH; 346/106; 400/120; 400/208; 242/199
[58] Field of Search .......... 346/76 PH, 76 R, 105, 346/106; 400/120, 214, 207, 208, 208.1, 608; 101/324; 219/216 PH; 242/55.3, 58, 58.1, 58.3, 58.6, 180, 181, 197, 199, 200

[56] References Cited

U.S. PATENT DOCUMENTS

| | | | |
|---|---|---|---|
| 3,726,212 | 4/1973 | Combs | 346/76 PH |
| 4,496,955 | 6/1985 | Maeyama et al. | 346/76 PH |

*Primary Examiner*—A. Evans
*Attorney, Agent, or Firm*—Cushman, Darby & Cushman

[57] ABSTRACT

In a printing apparatus which is loaded with a transfer member including a color agent to be transferred to a sheet and which transfers the color agent to the sheet in accordance with a pattern to form an image on the sheet, a cassette holding section is provided in a housing having a transferring function, whereby the transfer member is set in the position where the color agent can be transferred to the sheet in accordance with the pattern. The cassette holding section is provided with a holder for holding a spare transfer member.

15 Claims, 30 Drawing Figures

PRINTING APPARATUS WITH MULTIPLE RIBBON CASSETTES HOLDER

BACKGROUND OF THE INVENTION

The present invention relates to a printing apparatus for transferring a color agent to a sheet, thereby forming an image thereon.

Among conventional printing apparatuses of this type, there are thermal transfer printing machines which print by heating a ribbon impregnated with a color agent. Generally small-sized, low-priced, noise-free, and capable of printing on ordinary paper, these printing machines have recently been used for computers, recorders for the output of word processors, and copying apparatuses.

In printing, in the prior art printing apparatuses of this type, an unused ribbon wound on one roll shaft is wound up as a used ribbon by the other roll shaft after it is used as a printing medium.

Therefore, a conventional transfer material unit is provided with only a roll shaft and a ribbon (transfer material) wound thereon. In setting a replaceable ribbon in the printing apparatus, for example, an operator must mount the roll shaft wound with the ribbon on a ribbon mounting shaft attached to the apparatus housing, draw out one end portion of the ribbon from the roll shaft, and then pass the one end portion around a separate vacant roll shaft by hand.

Thus, the prior art printing apparatuses require much time and labor for setting the ribbon.

SUMMARY OF THE INVENTION

The object of the present invention is to provide a printing apparatus facilitating the replacement of transfer material.

According to an aspect of the present invention, there is provided a printing apparatus which is loaded with a transfer member and a spare transfer member including a color agent to be transferred to a sheet, and which transfers the color agent to the sheet in accordance with a pattern to form an image on the sheet, comprising a housing having a transferring function, mounting means in the housing for mounting the transfer member in the position where the color agent can be transferred to the sheet in accordance with the pattern, and holding means for holding the spare transfer member.

DETAILED DESCRIPTION OF THE PREFERRED EMBODIMENTS

Preferred embodiments of the present invention will now be described in detail with reference to the accompanying drawings of FIGS. 1 to 30.

Figure 1:
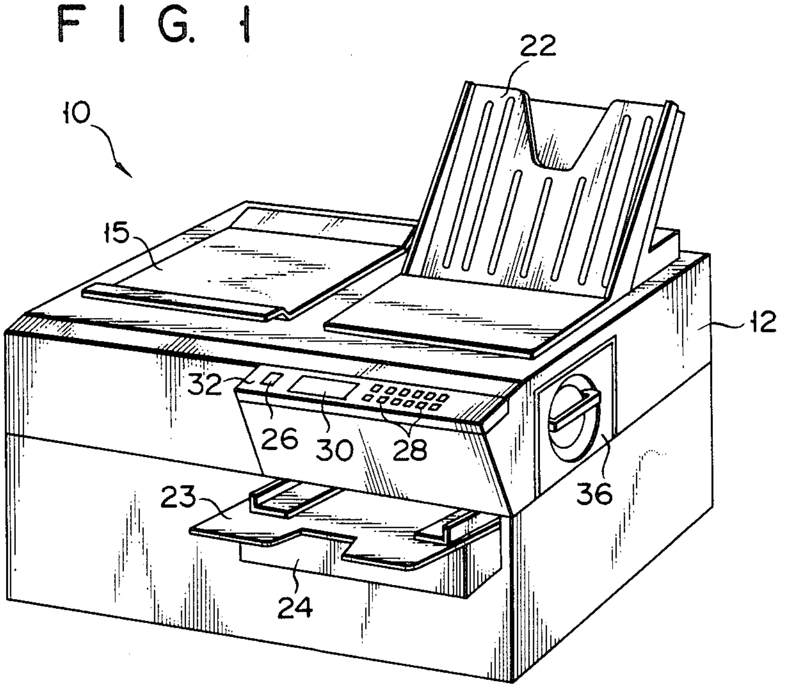
FIG. 1 is a perspective view of a printing apparatus according to one embodiment of the present invention.
Figure 2:
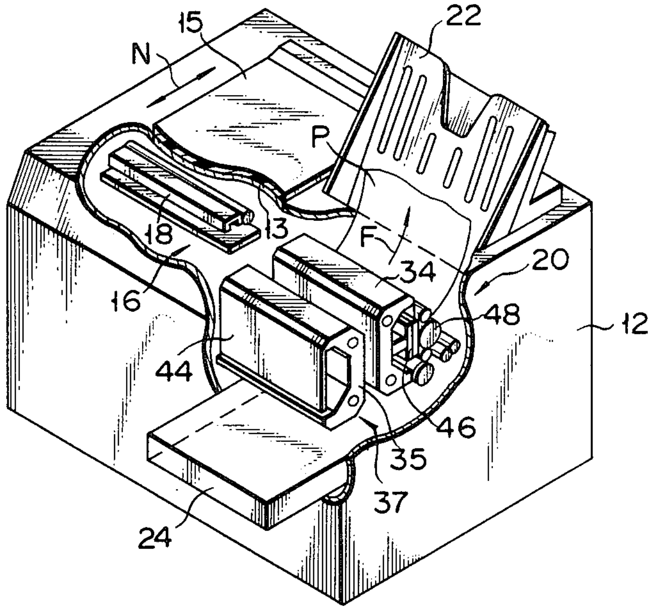
FIG. 2 is a broken away, perspective view schematically showing the printing apparatus of FIG. 1.

In a copying apparatus (printing apparatus) 10 having the thermal transfer function according to one embodiment of the invention, as shown in FIGS. 1 and 2, a housing 12 has an original table 14 on the top of which is placed an original paper to be copied. The original table 14 is formed of a transparent material such as glass. A swingable cover 15 overlies the original table 14 to cover the original paper thereon. Under the original table 14 lies a scanning unit 16 for scanning the original paper on the original table 14. The scanning unit 16 is provided with an optical exposure system 18 which can move in the direction of arrow N to expose the original. The scanning unit 16 also has a function to convert optical information obtained through the exposure system 18 into an electric signal. Disposed in the central portion of the housing 12 is an image forming unit 20 (mentioned later) for forming an image on a sheet in accordance with the electric signal from the scanning unit 16.

The housing 12 is fitted with a tray 22 at the top for discharging in the direction of arrow F the sheet on which the image has been formed by the image forming unit 20. A sheet cassette 24 for supplying the image forming unit 20 with sheets on which images are to be formed is removably attached to the front of the housing 12. The sheet cassette 24 is removably fitted at the top with a sheet-bypass guide 23 through which an operator can manually supply sheets one by one. Provided at the upper front portion of the housing 12 is an operator control panel 32 on which are arranged a start button 26, numeral keys 28 bearing numerals 0 to 9, and a display 30 for indicating operator guidance such as "clogging."

Inside the housing 12, the image forming unit 20 adjoins a ribbon cassette holding section 37 which holds a ribbon cassette (transfer member) 34 and a spare or auxiliary ribbon cassette (spare transfer member) 35 as mentioned later. In this embodiment, the cassette holding section 37 is integrally formed of a mounting means for mounting the ribbon cassette 34 and a holding means for holding the spare ribbon cassette 35. The cassette holding section 37 is provided with a door 36 which can be opened and closed when setting the ribbon cassettes 34 and 35 in place.

The image forming unit 20 is provided with a thermal head 46 formed of dots for heating that portion of a ribbon 44 which is exposed from the ribbon cassette 34 for color agent or ink transfer. The dots of the thermal head 46 is heated in accordance with the pattern signal from the scanning unit 16, and melts a color agent applied to the ribbon 44 to transfer it to the sheet. A platen 48 for pressing the ribbon 44 and the sheet P against the thermal head 46 faces the thermal head 46 with the ribbon 44 between them. A radiating board 50 for radiating heat generated from the thermal head 46 is disposed at the back (on the sheet cassette side) of the thermal head 46.

Figure 3:
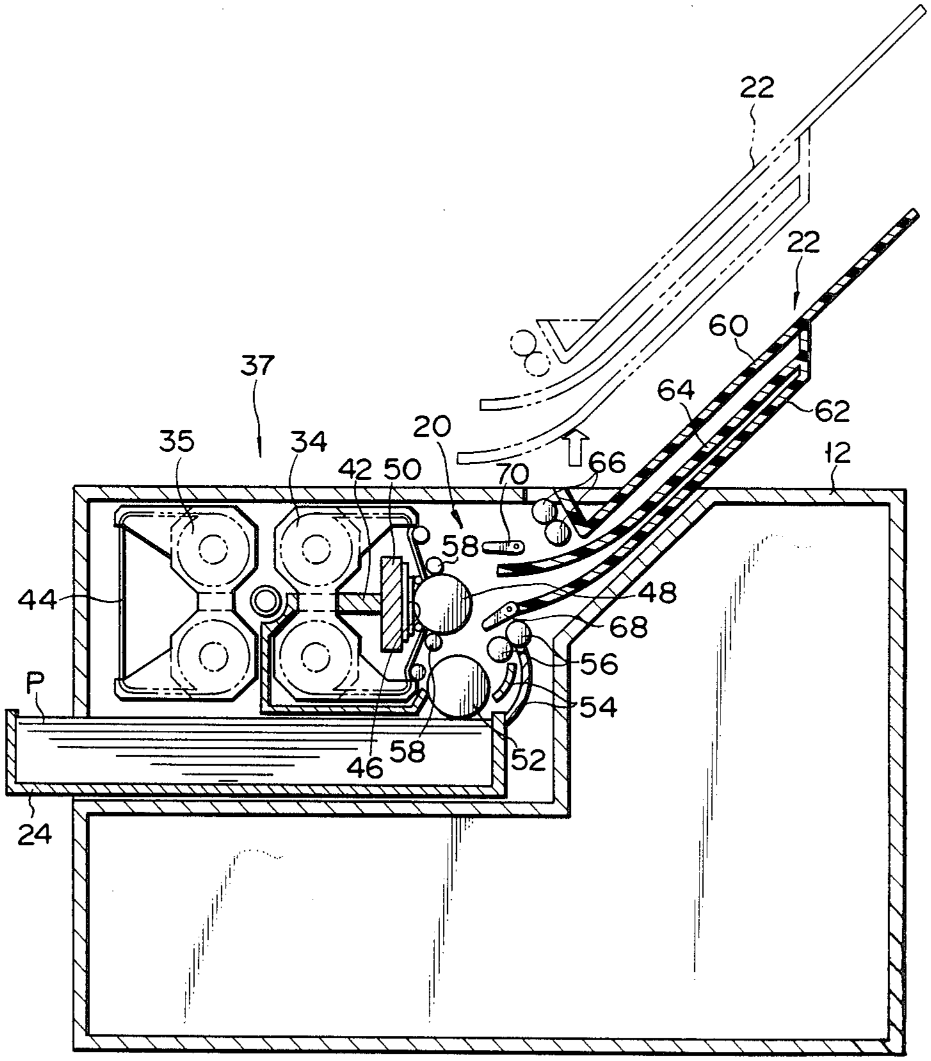
FIG. 3 is a vertical sectional view schematically showing the printing apparatus of FIG. 1.

Referring now to FIG. 3, the image forming unit 20 will be described in detail. A takeout roller 52 is disposed in front of the sheet cassette 24, whereby sheets P are taken out from the cassette 24. Arranged in close vicinity to the takeout roller 52 are a pair of guide plates 54 for guiding each sheet P taken out by the takeout roller 52, and a pair of aligning rollers 56 for aligning the front edge of the guided sheet P. In order to wind the sheet P fed from the aligning rollers 56 around the platen 48, backup rollers 58 are arranged on both the top and bottom sides of the platen 48 so as to press the sheet P against the platen 48.

The tray 22 adjoining the image forming unit 20 is integrally formed of a bearing plate 60 to receive the sheets having undergone image forming, and first and second guide plates 62 and 64 for guiding the sheets under image forming in a manner such that the sheets are temporarily held on the guide plates 62 and 64. A pair of exit rollers 66 for discharging the sheets from the image forming unit 20 onto the bearing plate 60 are arranged at the inner end portion of the bearing plate 60. The tray 22 and the exit rollers 66 are formed as one unit, which is removably attached to the housing 12.

At the inner end portion of the first guide plate 62, a first distribution guide 68 for changing the course of the sheets during the image forming operation is swingably set between the aligning rollers 56 and the platen 48. The first distribution guide 68 selectively guides those sheets being moved from the aligning rollers 56 toward the platen 48 and those sheets being moved from the platen 48 onto the first guide plate 62. Likewise, at the inner end portion of the second guide plate 64, a second distribution guide 70 is swingably set between the exit rollers 66 and the platen 48, whereby those sheets being moved onto the bearing plate 60 and those sheets being moved onto the second guide plate 64 are guided selectively.

Figure 4:
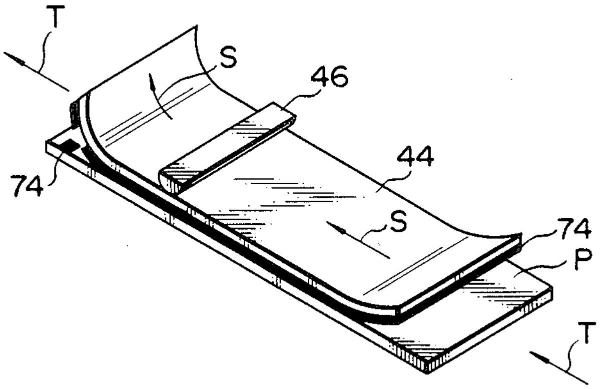
FIG. 4 is a perspective view for illustrating the transferring operation of the printing apparatus of FIG. 1.

In the thermal transfer printing using the thermal head 46, as shown in FIG. 4, ink or a color agent 74 applied to the ribbon 44 is heated and melted by the thermal head 46, and is transferred to a sheet P. During the thermal transfer, the ribbon 44 and the sheet P move simultaneously in the directions of arrows S and T, respectively.

Figure 5:
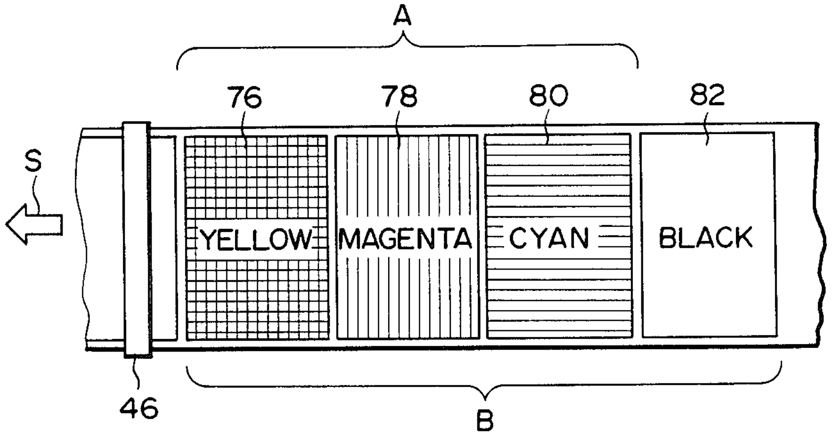
FIG. 5 is a plan view showing the way ink is applied to a ribbon used in the printing apparatus of FIG. 1.

As shown in FIG. 5, the ribbon 44 of, e.g., the one ribbon cassette 34, has a continuous range A covering, for example, a yellow-ink region 76, a magenta-ink region 78, and a cyan-ink region 80, or a range B covering all these regions 76, 78 and 80 plus a black-ink region 82. In the transfer, one of the above ink colors is first transferred to the sheet P. Then, the sheet P is returned to its original position to be subjected to ink transfer for another color. Thus, by repeating this transfer process, some ink colors are superposed to provide a color print. In general, a black color can be obtained by superposing the three colors in the range A. A deeper black color may be obtained by using a ribbon having the range B which covers the four color-ink regions including the black-ink region 82.

The other ribbon cassette 35, which may contain a ribbon of the same color arrangement as that of the one ribbon cassette 34, may be mounted on a ribbon cassette mounting unit 21 as a spare for the first ribbon cassette 34. Alternatively, the second ribbon cassette 35 may contain a ribbon which is coated with black ink (monotone). In this case, the first ribbon cassette 34 is used for color printing, while the second ribbon cassette 35 is used for black-color printing (monotone printing). In monotone printing, therefore, the ink for unnecessary colors may be saved.

Referring now to FIGS. 6 to 9, the operation of the image forming unit 20 for the color printing will be described.

Figure 6:
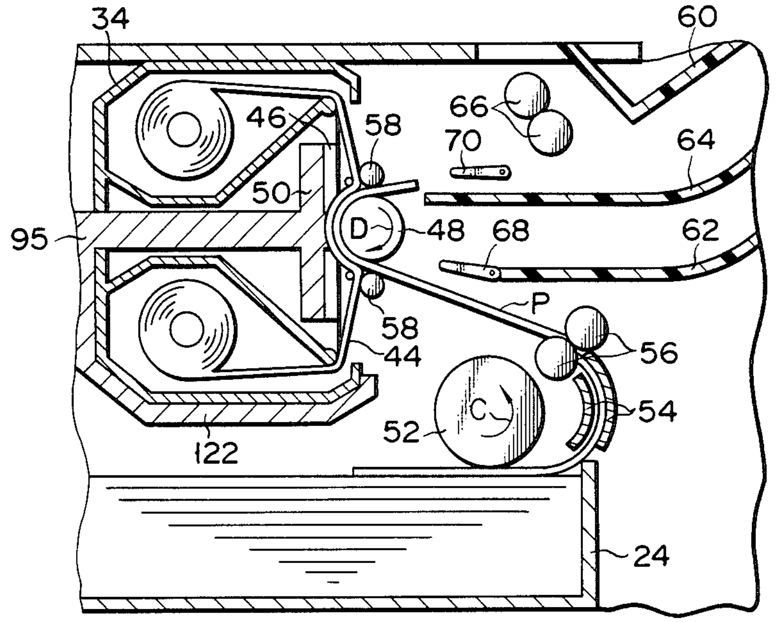
FIGS. 6 to 9 are sectional views for illustrating the operation of the printing apparatus of FIG. 1.

When the takeout roller 52 rotates in the direction of arrow C, as shown in FIG. 6, a sheet P is taken out from the sheet cassette 24. Then, the sheet P is guided to the aligning rollers 56 by the guide plate 54, and the front edge of the sheet P is aligned by the aligning rollers 56. The sheet P is further conveyed to reach the platen 48. Since the platen 48 is rotated clockwise or in the direction of arrow D, the sheet P moves along the platen 48 to face the thermal head 46 across the ribbon 44. As mentioned before, the thermal head 46 heats part of the ribbon 44 in accordance with the signal from the exposure system 18, thereby printing the first-color ink of the ribbon 44 on the sheet P.

Figure 7:
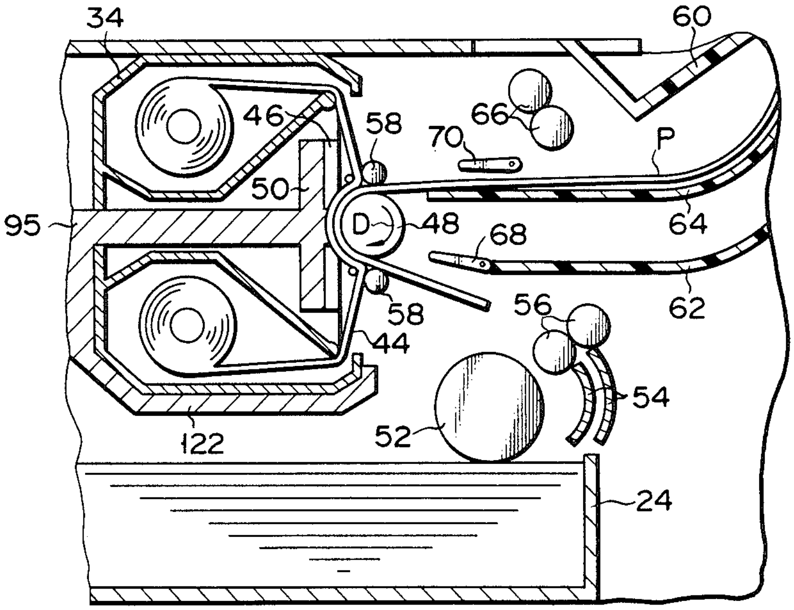

As shown in FIG. 7, the second distribution guide 70 is located substantially parallel to the second guide plate 64, and guides the sheet P having undergone the first printing cycle for the first color so that it is temporarily located on the second guide plate 64. The first distribution guide 68 rocks downward as shown in FIG. 8 after the sheet P passes by the guide 68.

Figure 8:
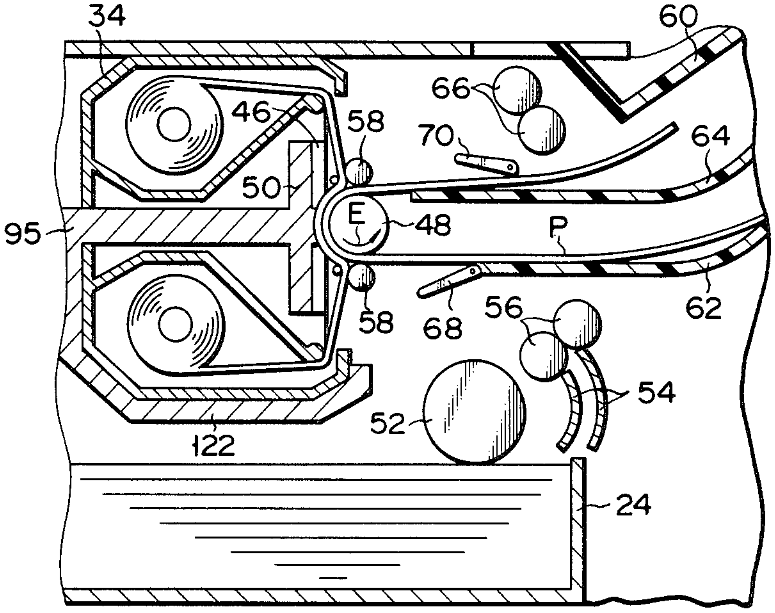

The sheet P having undergone the first printing cycle for the first color is moved from the upper surface of the second guide plate 64 to the upper surface of the first guide plate 62, as shown in FIG. 8. Namely, the sheet P is temporarily returned to the first guide plate 62 for the second printing cycle for the second color. The platen 48 is rotated counterclockwise or in the direction of arrow E, so that the sheet P is moved along the first guide plate 62. Since the first distribution guide 68 is held in the declined position, the sheet P smoothly moves along the upper surface of the first guide plate 62.

Figure 9:
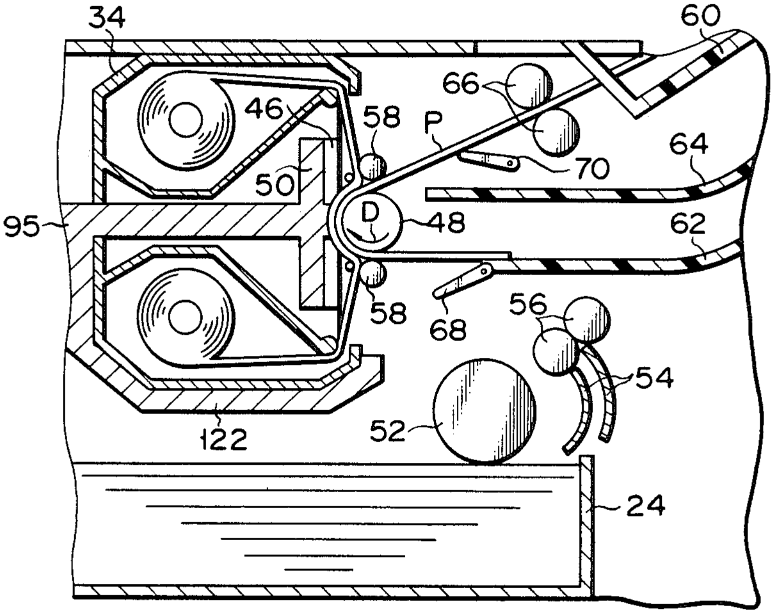

When the sheet P finishes being transferred to the upper surface of the first guide plate 62, the platen 48 rotates again in the direction of arrow D, as shown in FIG. 9, for the second printing cycle for the second color. After the printing process is thus repeated for the second, third and fourth colors, the second distribution guide 70 is held in its diagonally upward position so that the sheet P can be discharged onto the bearing plate 60. After printing (image formation) is completed, the sheet P is discharged onto the bearing plate 60 of the tray 22.

Figure 10:
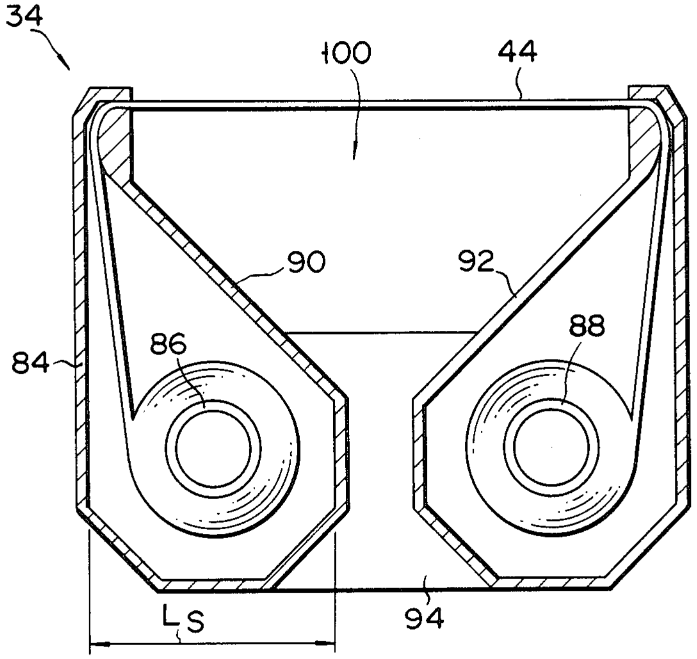
FIG. 10 is a sectional view of a ribbon cassette used in the apparatus of FIG. 1.

Referring now to FIGS. 10 to 13, one ribbon cassette 34 will be described in detail. A detailed description of the other ribbon cassette 35, which has substantially the same construction as the first ribbon cassette 34, is omitted. In the ribbon cassette 34, as shown in FIG. 10, two substantially parallel roll shafts 86 and 88 wound individually with the two end portions of the ribbon 44 are arranged inside a case 84. The ribbon 44 is enclosed by the case 84 so as to be partially exposed.

Figure 11:
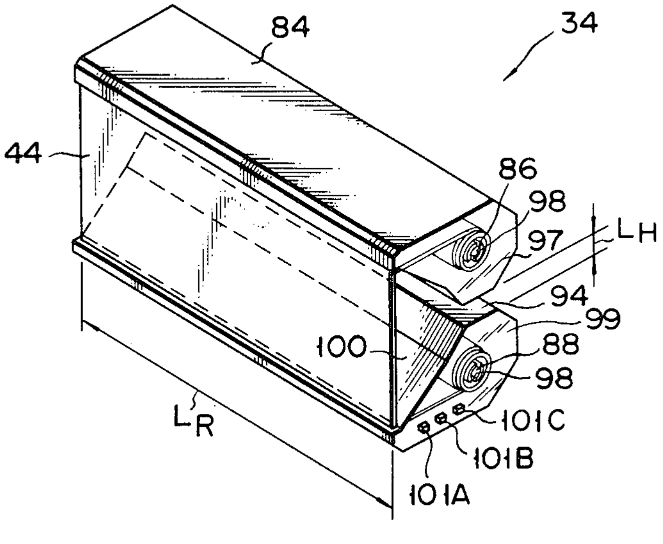
FIG. 11 is a perspective view of the ribbon cassette shown in FIG. 10.

A slit 94 to engage a first supporting portion 95 of a holder 93 (mentioned later) is defined between case portions 90 and 92 which contain the roll shafts 86 and 88, respectively, and the ribbon 44 wound on the roll shafts 86 and 88. As shown in FIG. 11, the slit 94 extends along the extending direction of the roll shafts 86 and 88 and terminates in the middle of the case 84. A pair of notches 98 which connect with a drive mechanism 96 (mentioned later) is formed in the slit-side end of each of the roll shafts 86 and 88.

Figure 30:
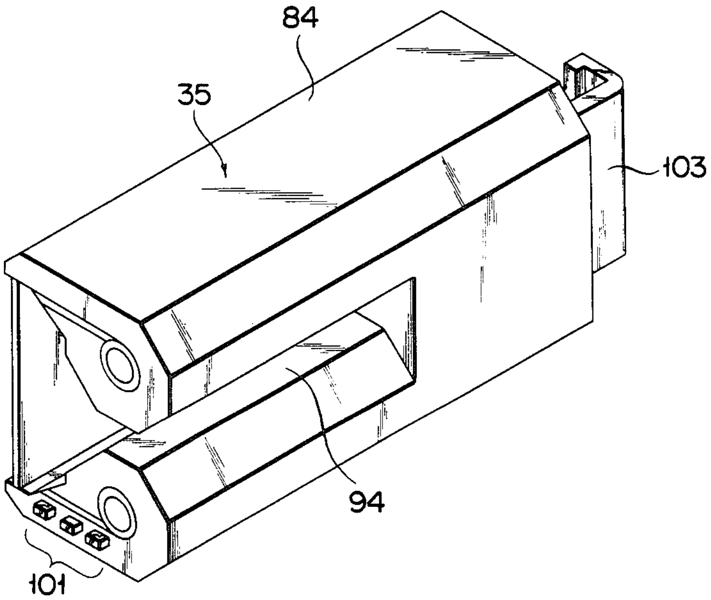
FIG. 30 is a perspective view showing still another modification of the ribbon cassette used in the embodiments of the invention.

Side walls 97 and 99 formed of a transparent plastic material are formed at the slit-side lateral portion of the case 84. Since the side walls 97 and 99 are transparent, the diameter of the roll of ribbon on each roll shaft can be externally observed with ease. The projections 101—the three projections 101A, 101B and 101C in this embodiment—are formed on the lower side wall 99, whereby the type of the ribbon cassette, e.g., the multicolor type, the monotone type, the size-B5 type, or the size-A4 type, is indicated. The projections 101 are detected by a detection mechanism 116, which will be described in detail later. As shown in FIG. 30, a grip 103 for the ease of loading or unloading the ribbon cassette may be formed on the opposite side wall of the case 84 which, like the side walls 97 and 99, is made of transparent material. In this case, the operator can hold the grip 103 when he or she inserts or removes the ribbon cassette 34 from the housing 12.

Figure 12:
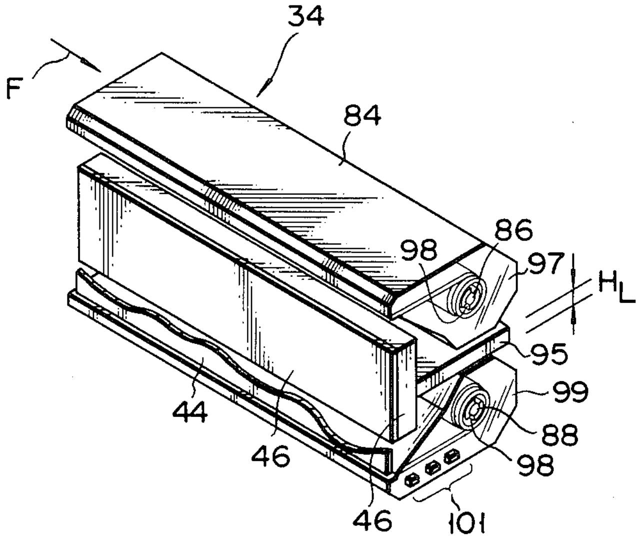
FIGS. 12 and 13 are perspective views for illustrating how the ribbon cassette of FIG. 11 is set in place.
Figure 13:
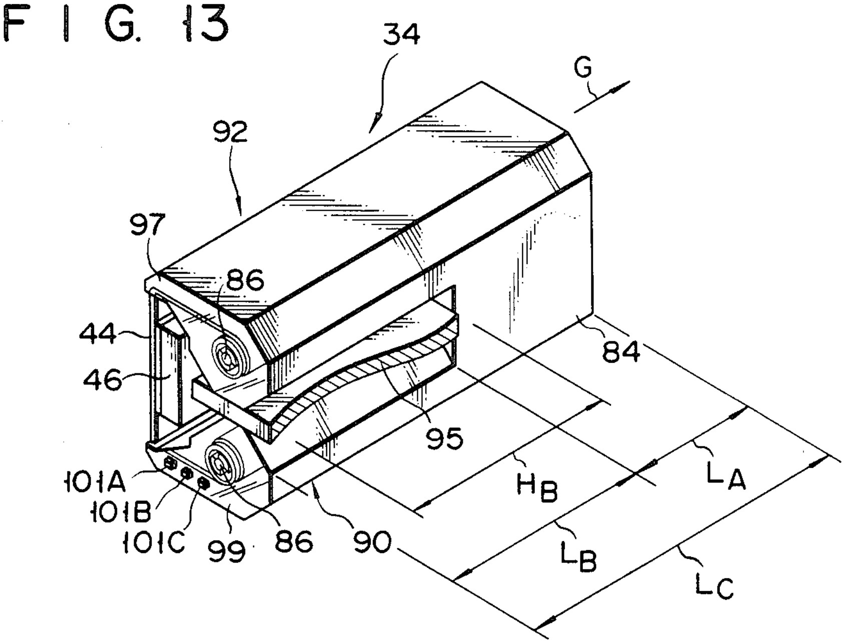

In the ribbon cassette 34, a space 100 capable of receiving the thermal head 46 is defined between the exposed portion of the ribbon 44 and the case portions 90 and 92. As shown in FIG. 11, the space 100 extends along the extending direction of the roll shafts 86 and 88. With this arrangement, as shown in FIGS. 12 and 13, the ribbon cassette 34 is pushed in the direction of arrow F against the first supporting portion 95 of the holder 93 and the thermal head 46 when it is inserted into the housing 12. When the ribbon cassette 34 is removed from the housing 12, it is drawn out in the direction of arrow G.

The dimensions of the ribbon cassette 34 are as follows. As shown in FIGS. 10 to 13, the width of the ribbon 44 is indicated by $L_R$ (FIG. 11); the maximum diameter of the roll of ribbon is indicated by $L_S$ (FIG. 10); the slit width is indicated by $L_B$ (FIG. 13); the slit height is indicated by $L_H$ (FIG. 11); the overall ribbon cassette length is indicated by $L_C$ (FIG. 13); the width of slitless portion of the ribbon cassette is indicated by $L_A$ (FIG. 13); the holder projection thickness is indicated by $H_L$ (FIG. 12); and the holder projection width is indicated by $H_B$ (FIG. 13). Hereupon, there is given a relation $L_B > \frac{1}{2} L_C$. In this embodiment, $L_C$ and $L_B$ are set to be 250 mm and approximately 160 mm, respectively. Thus, the width $L_B$ of the slit 94 to receive the first supporting portion 95 of the holder 93 is greater than one-half of the overall length $L_C$ of the ribbon cassette 34, so that the first supporting portion 95 can securely hold the ribbon cassette 34 over a long range when the ribbon cassette 34 is set in the housing 12.

Since the transverse supporting strength of the thermal head 46 depends on the width $H_B$ (approximately 160 mm in this embodiment) of the first supporting portion 95 of the holder 93, the slit 94 is formed in a manner such that $L_B$ (approximately 160 mm) is greater than $L_A$ (approximately 90 mm).

The slit height $L_H$ is a little greater than the holder thickness $H_L$ (approximately 10 mm in this embodiment), while the slit width $L_B$ is substantially equal to the width $H_B$ (approximately 160 mm) of the first supporting portion 95 of the holder 93. Thus, in loading the housing 12 with the ribbon cassette 34, no play or backlash will be produced between the first supporting portion 95 of the holder 93 and the case 84.

Figure 14:
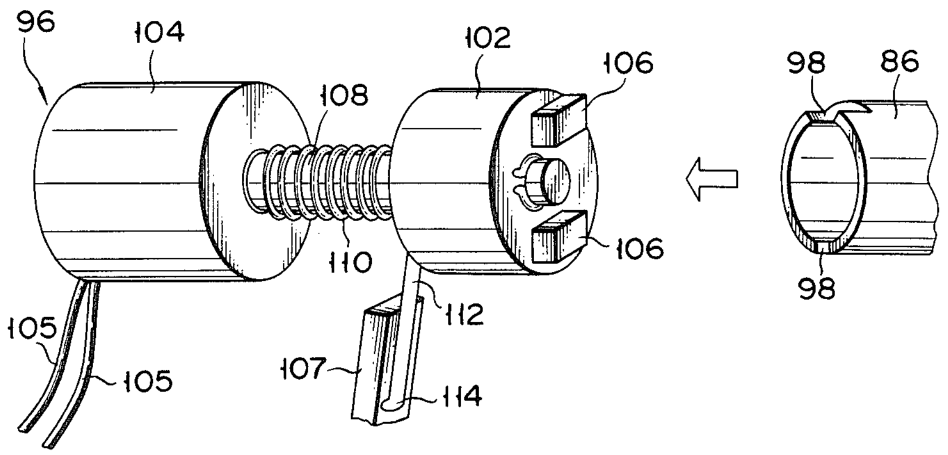
FIG. 14 is a perspective view schematically showing a roll shaft driving unit of the printing apparatus of FIG. 1.

Referring now to FIG. 14, there will be described the drive mechanism 96 for feeding or rewinding the ribbon 44 rolled in the ribbon cassette 34. The drive mechanism 96 is provided with a coupling 102 to engage the notches 98 of the roll shaft 86 or 88 and a motor 104 for supplying power to the coupling 102. The motor 104 is connected to a switch 107 and a power source (not shown) by means of cords 105. The switch 107 controls the drive of the motor 104 in setting the ribbon cassette 34 in the housing 12. The coupling 102 has a pair of projections 106 which practically engage the pair of notches 98. The pair of projections 106 are diametrically opposed to each other to correspond with the notches 98. The coupling 102 is connected to a drive shaft 108 of the motor 104 so as to be movable along the drive shaft 108. A spring 110, which is wound around the drive shaft 108 so as to extend along the same, urges the coupling 102 so that the coupling 102 is kept away from the motor 104. A lever 112 is fixed to the coupling 102, whereby the switch 107 for starting the motor 104 is turned on. A claw 114 for depressing the switch 107 is formed at the extreme end of the lever 112. The switch 107 is turned on to start the motor 104 when it is depressed by the claw 114. When the claw 114 is disengaged from the switch 107, the switch 107 is turned off to stop the motor 104.

In the drive mechanism 96 constructed in this manner, if the notches 98 of the roll shaft 86 (88) and the projections 106 are not engaged when the ribbon cassette 34 is set in the housing 12, the projections 106 are pressed against the end portion of the roll shaft 86 (88), so that the coupling 102 is moved toward the motor 104 against the urging force of the spring 110. Then, the lever 114 presses the switch 107 to turn it on, so that the drive shaft 108 of the motor 104 starts to rotate. As the drive shaft 108 rotates, the projections 106 shift their positions to be allowed to engage their corresponding notches 98. When the projections 106 engage the notches 98, the coupling 102 is moved by the urging force of the spring 110, so that the claw 114 of the lever 112 leaves the switch 107 to turn it off. When the switch 107 is off, it is separated from the claw 114 of the lever 112. During the normal drive of the motor 104, therefore, the switch 107 will never run against the claw 114, that is, it will not prevent the rotation of the coupling 102.

Figure 15:
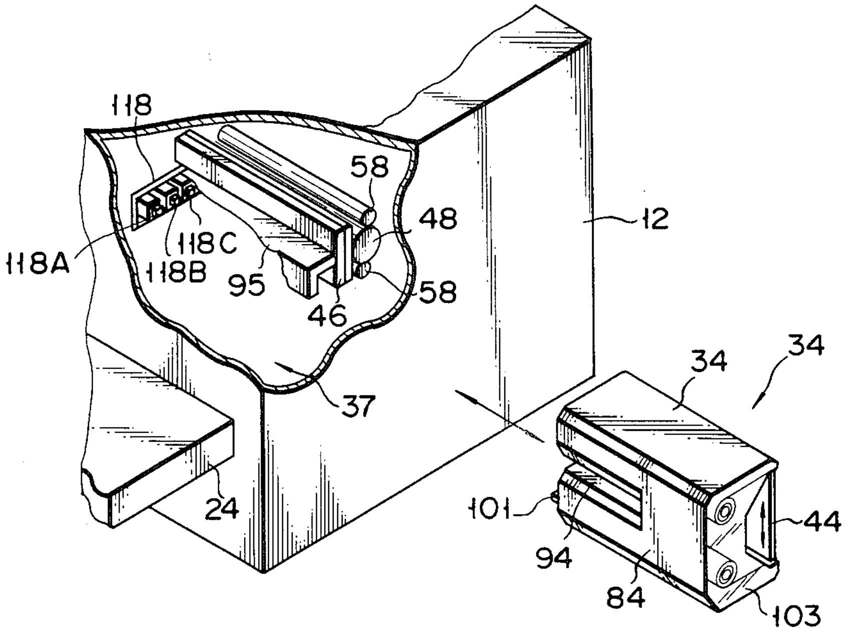
FIG. 15 is a perspective view for illustrating the way the ribbon cassette is set.
Figure 16:
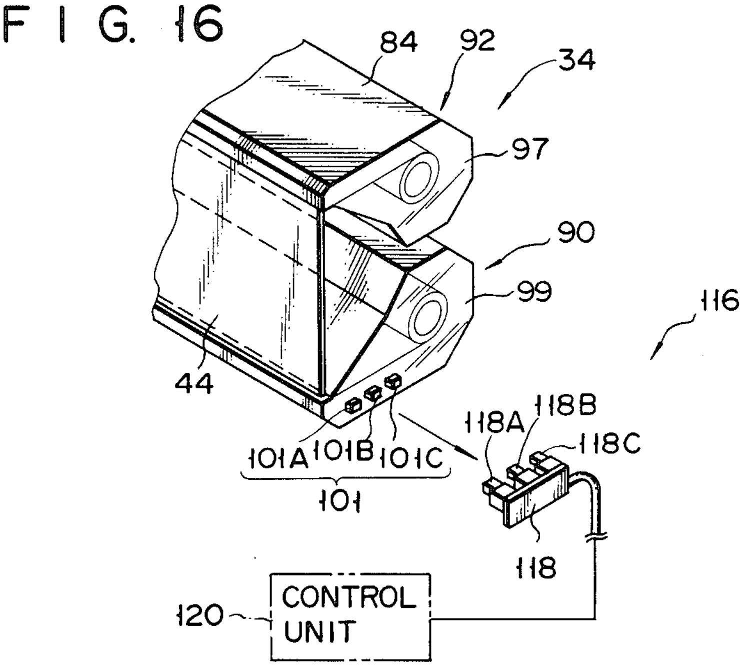
FIG. 16 is a perspective view showing a detection mechanism for detecting the type of ribbon cassette used.

Referring now to FIGS. 15 and 16, the detection mechanism 116 for detecting the type of the ribbon cassette 34 (35) will be described. In the housing 12, the detection mechanism 116 is attached to the ribbon cassette holding section 37 which is to be mounted with the ribbon cassette 34. The detection mechanism 116 is provided with a fixed switch means 118 which is depressed by the projections 101 (101A, 101B and 101C) to be activated when the ribbon cassette 34 is set in the ribbon cassette holding section 37. The switch means 118 includes three switch members 118A, 118B and 118C which correspond to the three projections 101A, 101B and 101C on the ribbon cassette 34, respectively. The switch members 118A, 118B and 118C are turned on when they are depressed by their corresponding projections 101. The switch means 118 is coupled to a control unit 120 which detects the on-off combination of the three switch members 118A, 118B and 118C and delivers a display signal to the display 30 (FIG. 1) in accordance with the result of the detection. Namely, when the ribbon cassette 34 is set in the ribbon cassette holding section 37, all or some of the three switch members 118A, 118B and 118C are turned on. Thus, the control unit 120 detects the type of the ribbon cassette on the basis of the on-off combination (binary-coded) of the switch members 118A. 118B and 118C. If all of the three switch members 118A, 118B and 118C are off, the control unit 120 concludes that the ribbon cassette 34 is not set in the housing 12, and delivers a display signal to that effect to the display 30 of the housing 12. Thereupon, the display 30 indicates a message "UNLOADED" or the like. The type of the ribbon cassette 34 to be determined, which may, for example, represent the print color, is a black-, red-, green- or multicolor-ribbon type. Table 1 shows the on-off combinations of the switch members 118A, 118B and 118C.

TABLE 1

| | Unloaded | Black Ribbon | Red Ribbon | Green Ribbon | Color Ribbon |
|---|---|---|---|---|---|
| Switch member 118A | OFF | ON | OFF | ON | ON |
| Switch member 118B | OFF | OFF | ON | ON | ON |
| Switch member 118C | OFF | OFF | OFF | OFF | ON |

Naturally, the projection or projections 101 which correspond to the switch member or members in the off position are not on the ribbon cassette 34. Namely, the projections 101 on the ribbon cassette are not always three in number, and only one or two projections may be formed on the ribbon cassette, depending on the type of ribbon cassette used. As mentioned before, the type of ribbon cassette to be determined does not always represent the print color, and may correspond to, e.g., the size of the printing sheets, such as size A4 or B5. In this case, the ribbon may be used without a loss. Alternatively, moreover, the detection mechanism 116 may be designed so as to detect the print color in combination with the sheet size.

Figure 17:
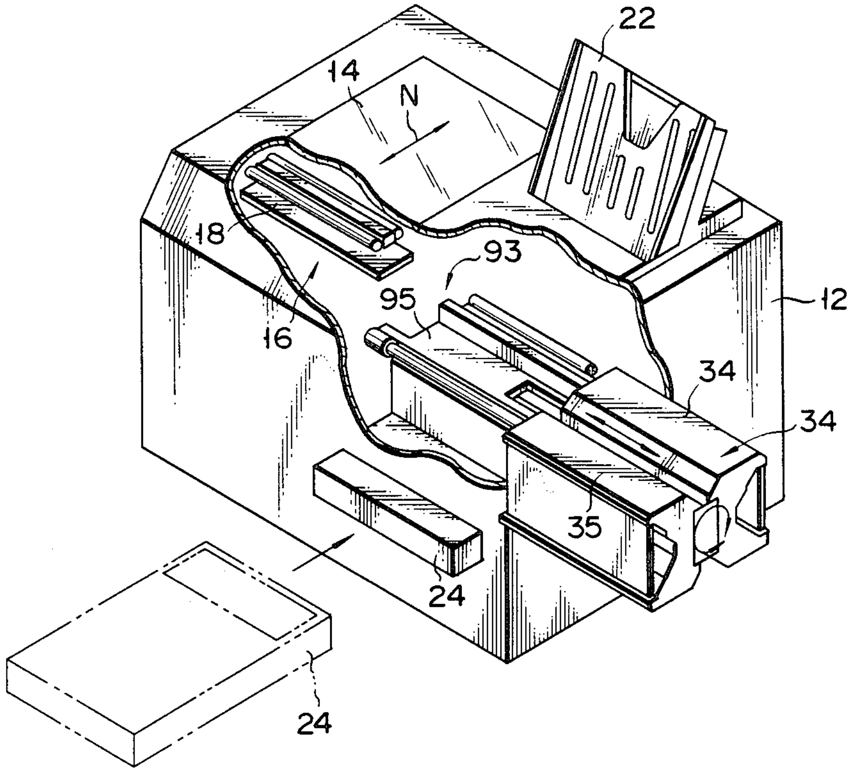
FIG. 17 is a perspective view schematically showing a ribbon cassette mounting section of the printing apparatus of FIG. 1.
Figure 18:
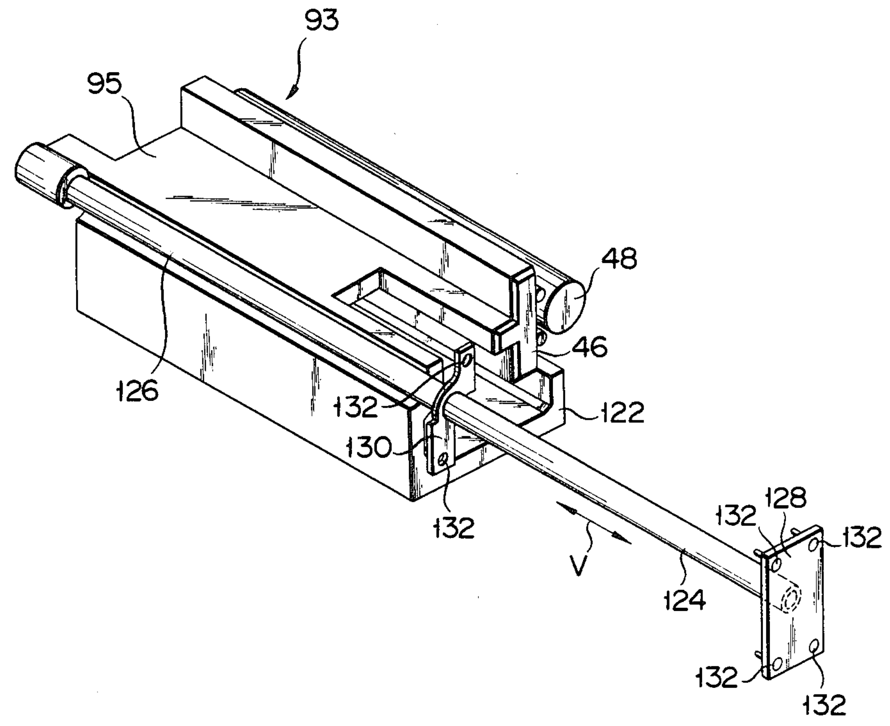
FIG. 18 is a perspective view schematically showing the principal part of the ribbon cassette mounting section of FIG. 17.
Figure 19:
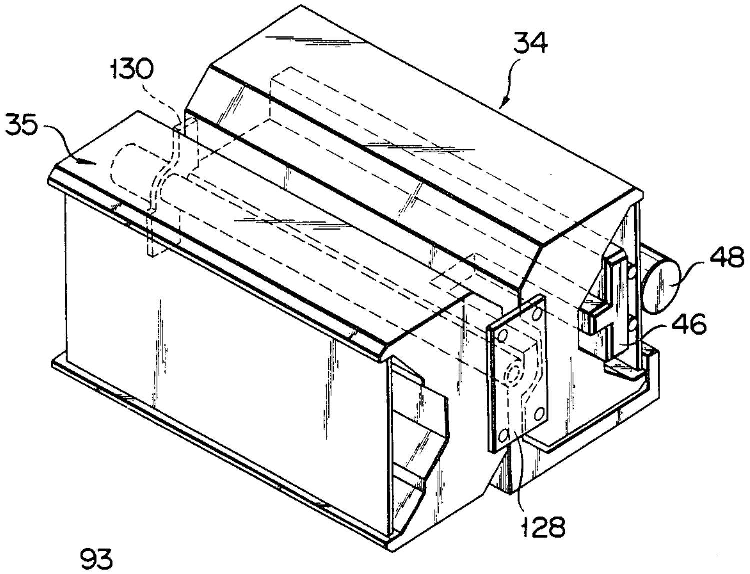
FIGS. 19 and 20 are perspective views for illustrating the way the ribbon cassettes are attached to the ribbon cassette mounting section.

Referring now to FIGS. 17 to 19, the ribbon cassette holding section 37 capable of holding the two ribbon cassettes 34 and 35 will be described in detail. In this embodiment, the ribbon cassette holding section 37 integrally incorporates a mounting portion for mounting the ribbon cassette 34 and a holding portion for holding the spare ribbon cassette 35. The ribbon cassette holding section 37 is provided with a holder 93 which extends in the extending direction of the platen 48 or in the direction of insertion of the ribbon cassettes. The holder 93 holds one ribbon cassette 34 in a manner such that the exposed portion of the ribbon of the ribbon cassette 34 faces the platen 48. The holder 93 can also hold the other ribbon cassette 35 so that the two cassettes face in opposite directions. In other words, a ribbon cassette holding section for replacement is provided in the housing 12. The holder 93 has the first supporting portion 95 and a second supporting portion 122 which is substantially L-shaped so as to hold securely the ribbon cassettes 34, i.e., that ribbon cassette which faces the platen 48 for actual printing. The first supporting portion 95 extends to cover approximately two-thirds of the longitudinal dimension of the holder 93 so that it is fitted in the slit 94 of the ribbon cassette 34. The second supporting portion 122 is formed so as to bear thereon and hold the ribbon cassette 34. Thus, having its lower case portion 90 (including the one roll shaft 88) substantially enclosed by the first and second supporting portions 95 and 122, the first ribbon cassette 34 can be held securely.

Provided on one side of the first supporting portion 95 are a rod 124 which can hold the two ribbon cassettes concurrently and rotate through about 180 degrees to replace the ribbon cassettes, and a fixed guide shaft 126 which holds the rod 124 so as to be slidable along the longitudinal direction of the holder 93 (direction of arrow V), whereby the rod 124 is guided along the outer peripheral surface of the guide shaft 126. The rod 124 is fixedly fitted at each end with fitting plates 128 and 130 for mounting the two ribbon cassettes 34 and 35 on the rod 124. Screws 132 for fixing the ribbon cassettes are attached to the fitting plates 128 and 130.

Figure 20:
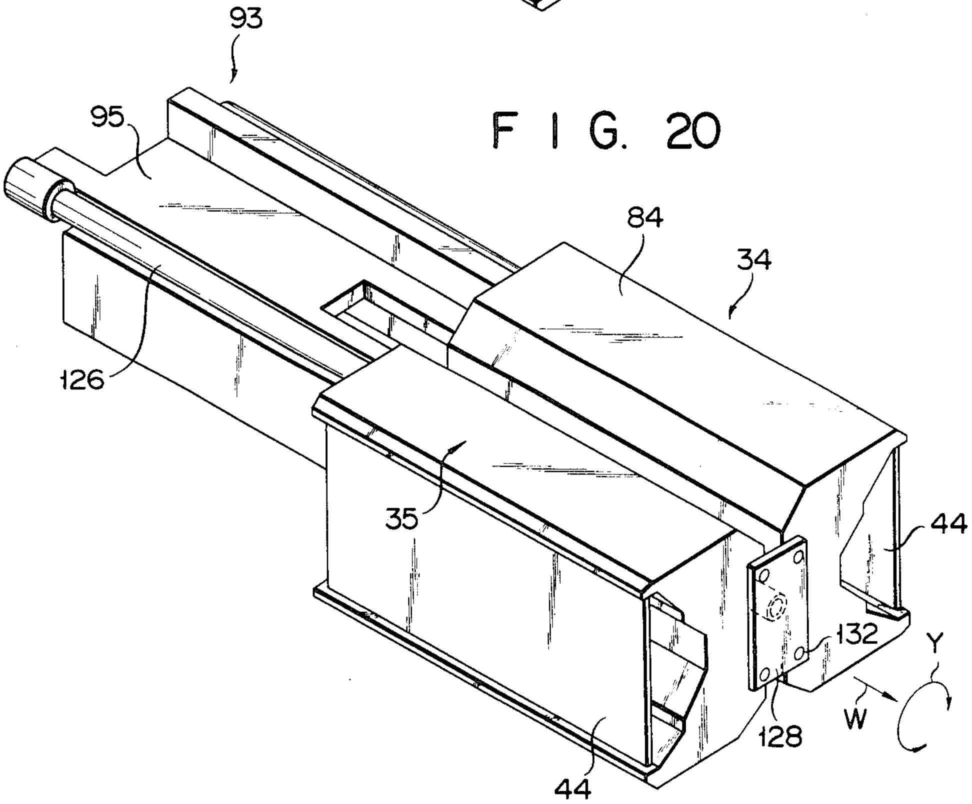

In replacing the ribbon cassettes 34 with the spare ribbon cassette 35 after the ribbon of the first cassette 34 is used up, the rod 124, along with the two ribbon cassettes 34 and 35 thereon, is slid in the direction of arrow W (FIG. 20). As a result, the ribbon cassette 34 is disengaged from the holder 95. Then, the rod 124 is rotated 180 degrees in either direction, as indicated by arrow Y in FIG. 20, thereby causing the two ribbon cassettes 34 and 35 to change positions with each other. Then, the two ribbon cassettes 34 and 35, along with the rod 124, are mounted again on the holder 93, as shown in FIG. 19. With this arrangement of the ribbon cassette holding section 37, the ribbon cassette may easily be replaced in a short time.

Although the screws 132 are attached to the fitting plates 128 and 130 for mounting the ribbon cassettes in this embodiment, they may be replaced with projections formed on the fitting plates 128 and 130. In this case, recesses to engage the projections are formed in the side walls 97 and 99 of the ribbon cassettes 34 and 35.

Figure 21:
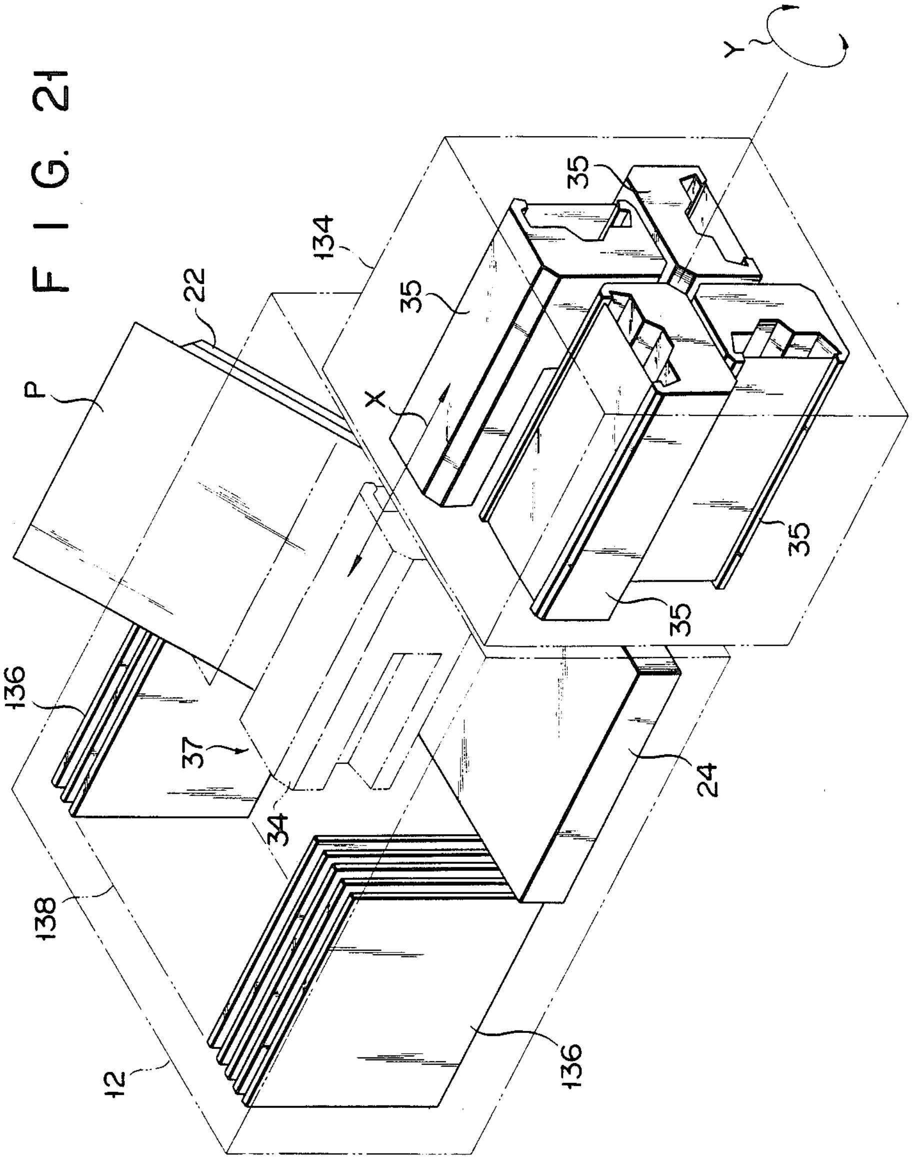
FIG. 21 is a perspective view schematically showing a apparatus according to another embodiment of the invention.
Figure 26:
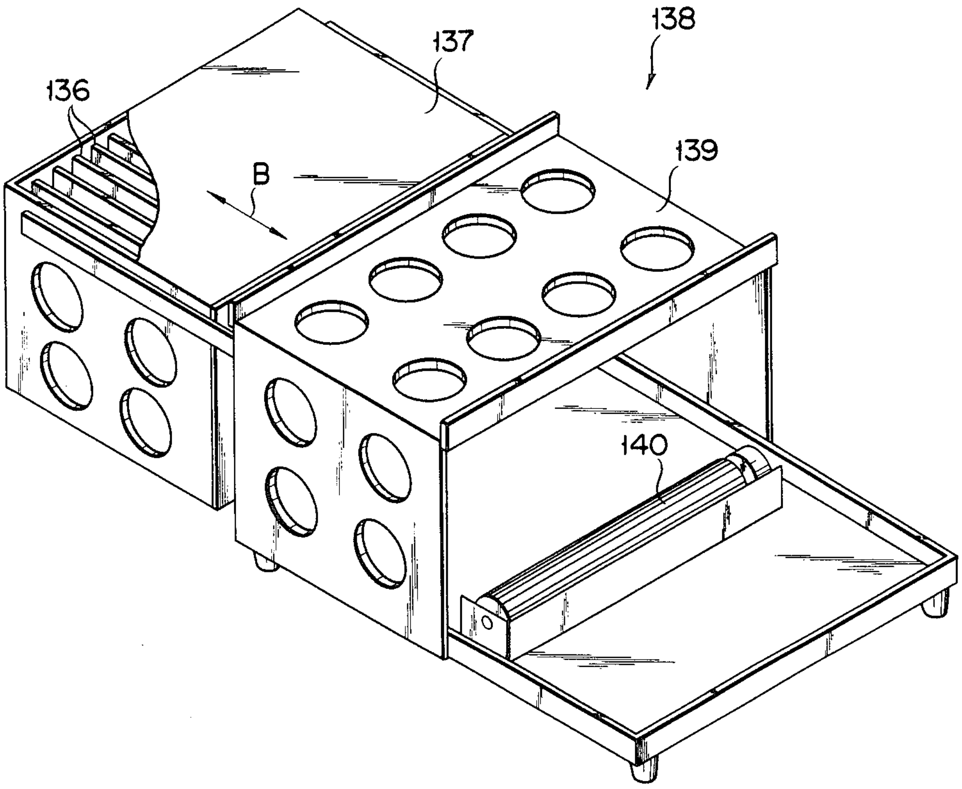
FIG. 26 is a perspective view of a distributor unit shown in FIG. 21.

Referring now to FIGS. 21 and 26, another embodiment of the invention will be described in detail. In this second embodiment, that portion (holding means) of the ribbon cassette holding section which holds the spare ribbon cassette is formed as a unit independent of the housing 12. Namely, that portion of the ribbon cassette holding section 37 inside the housing 12 serves as the mounting means to mount the one ribbon cassette 34. With respect to the other portions, the second embodiment is substantially the same as the first embodiment. Therefore, like reference numerals are used to designate like portions included in the first embodiment, and a detailed description of those portions is omitted.

Figure 22:
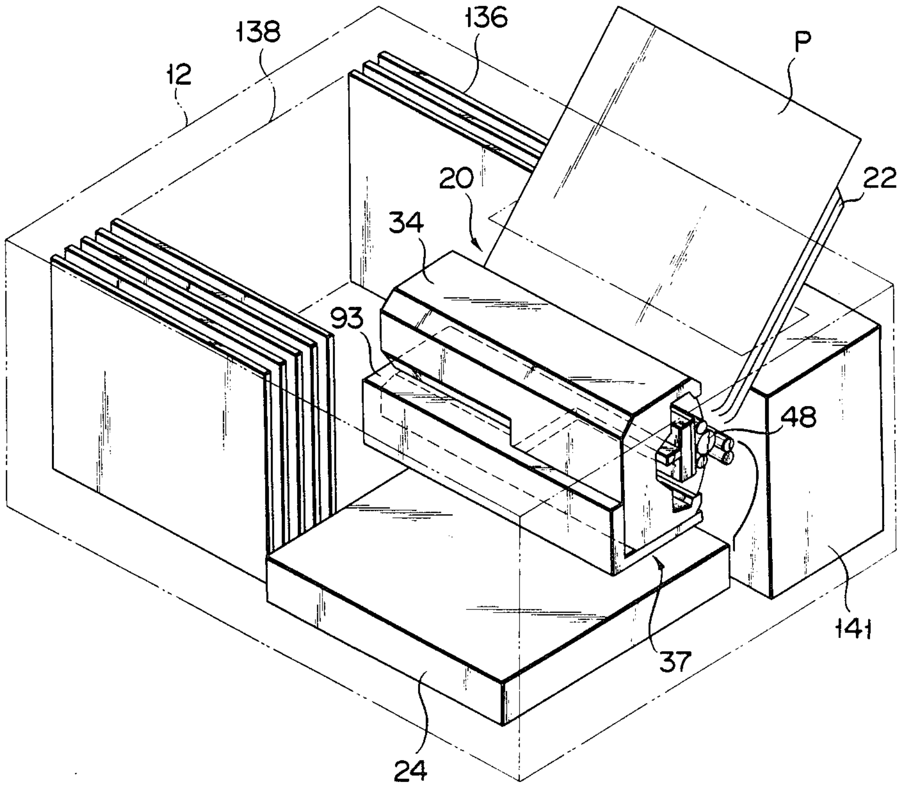
FIG. 22 is a schematic perspective view illustrating a ribbon cassette mounting section of the printing apparatus shown in FIG. 21.

In the second embodiment, as shown in FIGS. 21 and 22, a cassette holding unit (holding means) 134 capable of holding four spare ribbon cassettes 35 to replace the first ribbon cassette 34 is provided independently of the housing 12. In the holding unit 134, which will be described in detail later, the ribbon cassettes 35 can move (rotate). Disposed in the housing 12 is a distributor unit 138 containing switchboards 136 arranged for actuating the housing 12.

As shown in FIG. 26, the distributor unit 138 is provided with a switch box 137 which contains the switchboards 136 and which can be housed in a casing 139 with cooling holes. The switch box 137 can slide along the direction of arrow B. Numeral 140 designates a fan unit for cooling the interior of the distributor unit 138.

In FIG. 22, a power supply unit 141 for actuating the housing 12 is disposed behind the image forming unit 20 or the tray 22.

Figure 23:
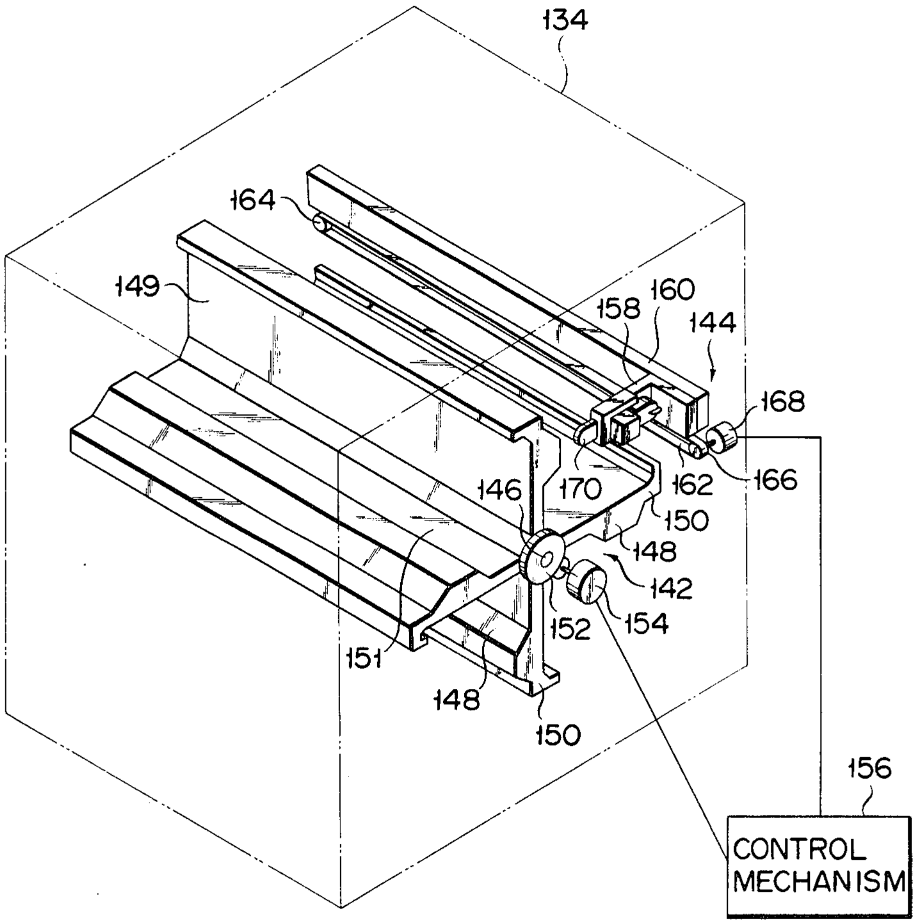
FIG. 23 is a perspective view schematically showing the principal part of a cassette holding unit shown in FIG. 21.

As shown in FIG. 23, the cassette holding unit 134 is provided with a rotating rack 142 rotatable with the spare ribbon cassettes 35 thereon, and a cassette shifting mechanism 144 for delivering each ribbon cassette 35 on the rotating rack 142 to the ribbon cassette holding section (mounting means) 37 in the housing 12.

The rotating rack 142 includes a rotating shaft 146 and four retaining plates 148 protruding integrally outward therefrom at regular intervals. Each retaining plate 148 holds one ribbon cassette 35. Each retaining plate 148 has thereon a guide ridge 150 for securely retaining the bottom portion of the ribbon cassette and guiding the ribbon cassette in movement. Each ribbon cassette 35 is held in two different directions between a front face 149 (surface with the guide ridge 150 thereon) of one retaining plate 148 and a rear face 151 of another retaining plate 148 in front. The rotating shaft 146 is coupled to a motor 154 by means of a reduction mechanism (e.g., gear) 152. The motor 154 is a reversible motor, which is connected to a control mechanism 156. The control mechanism 156 controls the drive of the motor 154 through the operation of an operator control panel (not shown) attached to the cassette holding unit 134. Namely, the retaining plates 148 are rotated by about 90 degrees by the motor 154 to set each ribbon cassette 35 in a predetermined position which corresponds to the ribbon cassette holding section 37 in the housing 12.

The cassette shifting mechanism 144 is provided with a feed member 158 which engages the ribbon cassette 35 and moves it toward the ribbon cassette holding section 37 in the housing 12 when the ribbon cassette 35 is set in the predetermined position. The feed member 158 slidably engages a guide rail 160 for guiding its movement. The guide rail 160 extends along the extending direction of the rotating shaft 146. Under the guide rail 160, a belt 162 for reciprocating the feed member 158 along the guide rail 160 is stretched along the guide rail 160 between rollers 164 and 166. Part of the belt 162 is fixed to the feed member 158. The roller 166 is coupled to a reversible motor 168 for driving the belt 162. The reversible motor 168 is coupled to the control mechanism 156, and is driven through the operation of the operator control panel (not shown).

Figure 24:
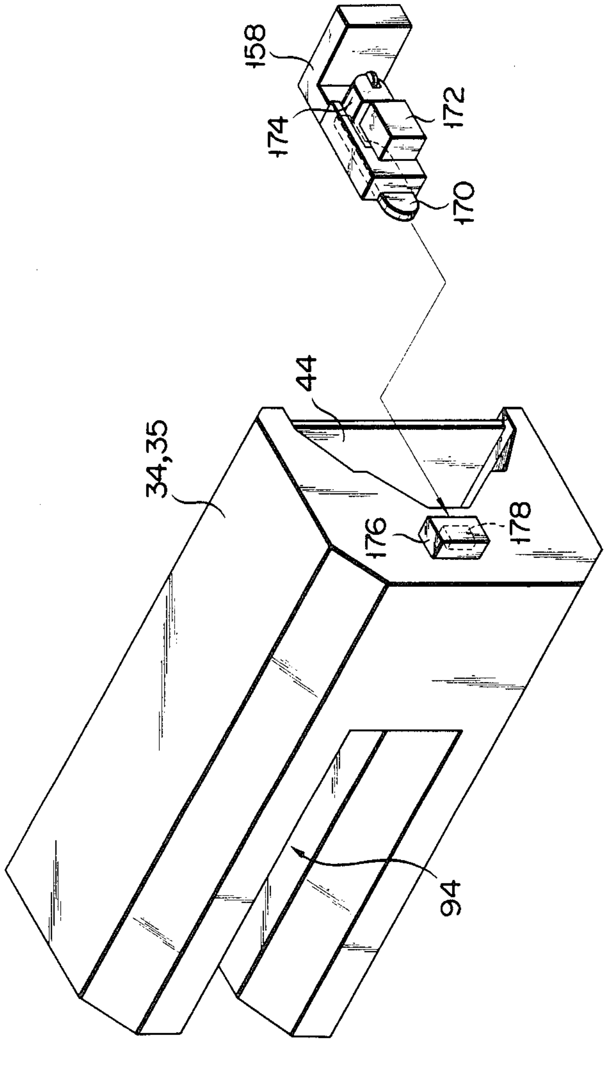
FIG. 24 is a perspective view illustrating the way the ribbon cassette engages a feed member of a cassette shifting mechanism shown in FIG. 23.

As shown in FIG. 24, the feed member 158 includes an engaging claw 170 and a solenoid 172 for projecting the claw 170. The solenoid 172 and the engaging claw 170 are coupled to a link mechanism 174, and the engaging claw 170 is projected from the feed member 158 when the solenoid 172 is excited. The solenoid 172 is coupled to the control mechanism 156 (shown in FIG. 23), and is driven in synchronism with the drive of the reversible motor 168.

The ribbon cassette 34 (35) used in this second embodiment, as shown in FIG. 24, is provided with an engaging member 176 to engage the claw 170. The engaging member 176 is attached to the central portion of a side wall 178 (opposite to the slit-side wall) of the ribbon cassette 34 (35), and has a cavity 178 to receive the engaging claw 170.

Figure 25:
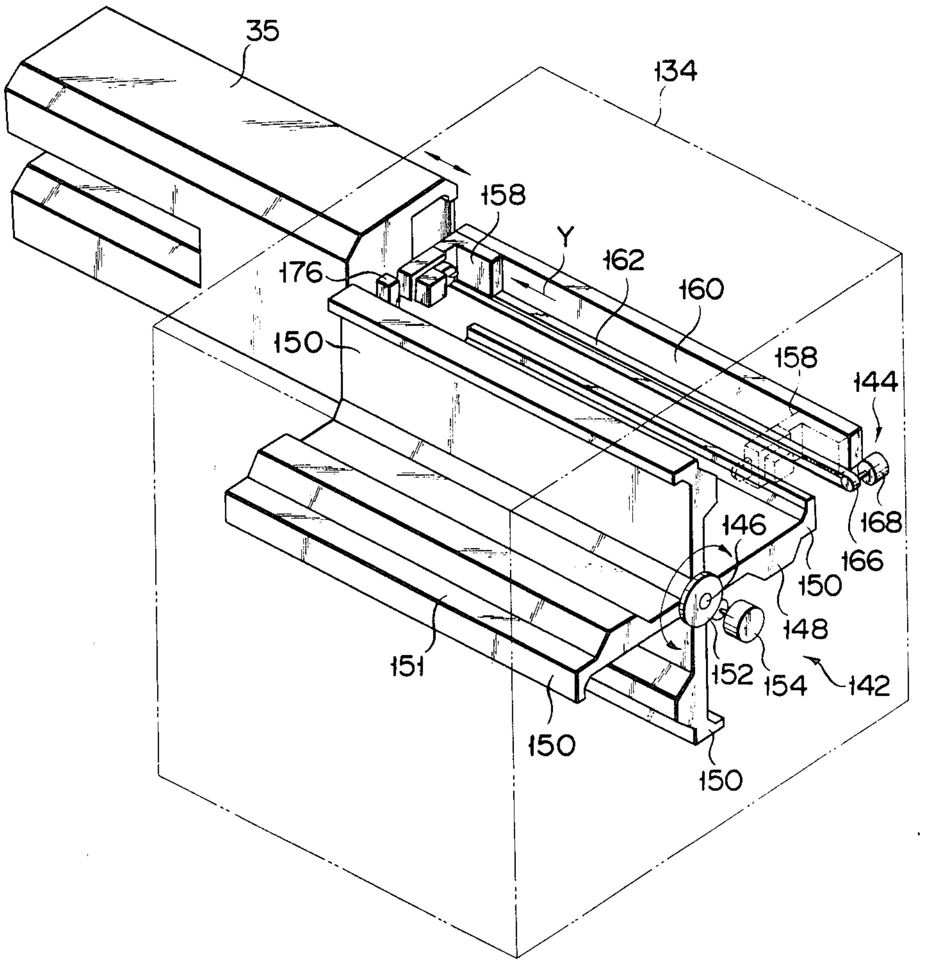
FIG. 25 is a perspective view for illustrating the operation of the cassette shifting mechanism shown in FIG. 23.

Referring now to FIG. 25, the operation of the cassette shifting mechanism 144 will be described. First, one of the spare ribbon cassettes 35 held by the retaining plates 148 is set in the position facing the ribbon cassette holding section 37 by rotating the rotating rack 142. Then, the engaging claw 170 is caused to engage the engaging member 176 of the set ribbon cassette 35, and the belt 162 is driven to move the feed member 158 in the direction of arrow Y. As a result, the ribbon cassette 35 is moved from the cassette holding unit 134 to the cassette holding section 37 in the housing 12, where it is set in position. Namely, the feed member 158 moves from one end portion (indicated by broken line in FIG. 25) of the guide rail 160 to the other end portion (indicated by the solid line). Then, the claw 170 is disengaged from the engaging member 176, and the feed member 158 is returned to its starting position (indicated by the broken line). In returning the ribbon cassette held in the ribbon cassette holding section 37 in the housing 12 to one of the vacant retaining plates 148 of the cassette holding unit 134, the feed member 158 is caused to engage the engaging member 176 of the ribbon cassette 35 in the ribbon cassette holding section 37 at the position near the other end portion of the guide rail 160, and is then moved to the position near the one end of the guide rail 160. With this cassette shifting mechanism 144, the ribbon cassette 35 can be automatically set in or removed from the cassette holding section 37 with ease. In replacing the ribbon cassette, the ribbon cassette 35 is first moved from the housing 12 to the vacant retaining plate 148 of the ribbon cassette holding unit 134, and then another ribbon cassette 35 is fed from the ribbon cassette holding unit 134 to the ribbon cassette holding section 37 in the housing 12 to be set therein.

According to the second embodiment, the ribbon cassette can be automatically replaced with ease and in a short time, and the printing apparatus may be provided concurrently with a plurality of spare ribbon cassettes.

Provided with the holding means for holding a spare transfer member or members, the printing apparatus according to the present invention facilitates the replacement of the transfer material.

It is to be understood that the present invention is not limited to the embodiments described above, and that various changes and modifications may be effected therein by one skilled in the art without departing from the scope or spirit of the invention.

Figure 27:
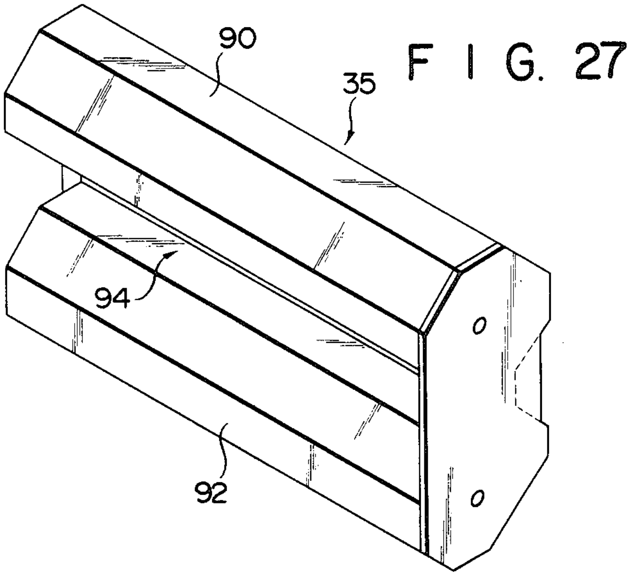
FIG. 27 is a perspective view showing a modification of the ribbon cassette.

For example, the slit 94 of the ribbon cassette used in the printing apparatus of the invention may be formed so as to extend through the whole longitudinal dimension of the ribbon cassette along the axis of each roll shaft, as shown in FIG. 27.

Figure 28:
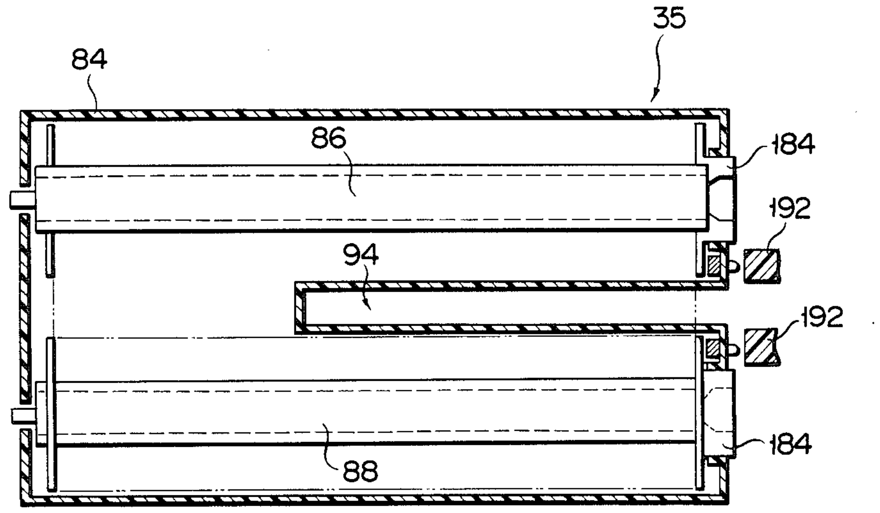
FIG. 28 is a sectional view showing another modification of the ribbon cassette.
Figure 29:
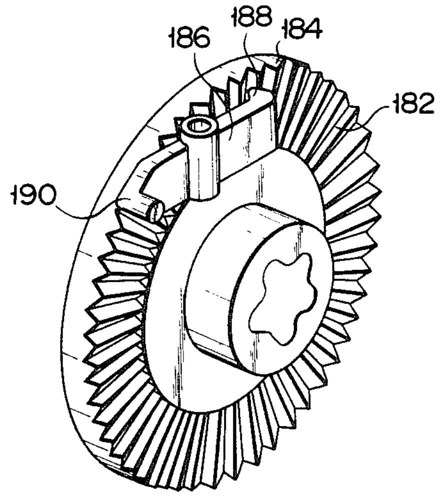
FIG. 29 is a perspective view showing the principal part of a lock mechanism of the ribbon cassette shown in FIG. 28.

As shown in FIGS. 28 and 29, moreover, the ribbon cassette 35 may be provided with a stop mechanism 180 for fixing the roll shafts 86 and 88 so that the ribbon wound thereon is always stretched tight. The stop mechanism 180 includes disks 184 fixed to one end portions of their corresponding roll shafts 86 and 88 and having teeth 182 thereon, and engaging members 186 attached to the case 84 and adapted to engage the teeth 182 of their corresponding disks 184. Each engaging member 186 is rockable around its central portion 181. A claw 188 capable of engaging the teeth 182 is formed on one end portion of the engaging member 186, and a projection 190 protruding outward from the case 84 is formed on the other end portion. The engaging member 186 is always urged by a spring (not shown) so that the claw 188 engages the teeth 182. In this case, the ribbon cassette holding section 37 is provided with push portions 192 in the positions corresponding to the projections 190, whereby the projections 190 can be pushed. The stop mechanism 180 is released when the ribbon cassette is set in the ribbon cassette holding section 37. When the ribbon cassette holding section 37 is not loaded, the roll shafts 86 and 88 are fixed or locked.

In the second embodiment described above, four ribbon cassettes are held by the rotating rack. However, the rotating rack may be designed so as to be able to hold any other suitable number of cassettes, e.g., six or eight. In this case, the rotating rack is provided with retaining plates which are equal to the number of ribbon cassettes to be held concurrently and which are arranged at regular intervals.

What is claimed is:

1. A printing apparatus which is loaded with a transfer member and a spare transfer member including a color agent to be transferred to a sheet, and which transfers the color agent to the sheet in accordance with a pattern to form an image on the sheet, comprising:

a housing having a transferring function;

mounting means in the housing for mounting the transfer member in the position where the color agent can be transferred to the sheet in accordance with the pattern; and holding means formed integrally with the housing and located close the mounting means for holding the spare transfer member, wherein said holding means includes a holder for simultaneously and rotatably holding the transfer member to be attached to the mounting means and the spare transfer member to be attached to the holding means in back to back relationship so that the transfer members held by the holder can be replaced with each other by rotating the holder through approximately 180 degrees.

2. A printing apparatus comprising:

a pair of transfer cassettes each including a transfer ribbon having a printing agent transferrable to a recording sheet which thereby forms an image upon said recording sheet;

mounting means for commonly mounting said pair of transfer cassettes one to another in back-to-back relationship so that one of said transfer cassettes is disposed in a print position whereby an image may be formed upon a recording sheet thereat and so that the other of said pair of transfer cassettes is disposed in a reserve position, said mounting means including means permitting concurrent rotation of said pair of transfer cassettes about a common axial such that rotation of said one transfer cassette from said print position and into said reserve position responsively causes said other transfer cassette to be simultaneously rotated from said reserve position and into said print position whereby said other transfer cassette is then disposed so that the printing agent thereof may be used to print an image upon a recording sheet.

3. A printing apparatus of the type utilizing plural transfer cassettes each having a transfer ribbon which carries a transferrable printing agent, said apparatus comprising:

a housing including means establishing a print position such that the printing agent from said transfer cassette is transferrable to a recording sheet to form an image thereon;

mounting means in said housing for mounting said transfer cassette in said print position; and holding means provided independently of, yet operably associated with, said housing for holding a plurality of said transfer cassettes, said holding means including:

(i) a rotatable holding unit having plural radially-extending holders for holding respective ones of said transfer cassettes in reserve positions;

(ii) means for rotating said holding unit so that a predetermined one of said holders is laterally indexed relative to said print position of said housing; and (iii) shifting means for shifting one of said transfer cassettes between said mounting means of said housing and said predetermined one of said holders so that said one of said transfer cassettes is responsively shifted between said print and reserve positions.

4. A printing apparatus which is loaded with a transfer means and a plurality of spare transfer members each including a color agent to be transferred to a sheet, and which transfers the color agent to the sheet in accordance with a pattern to form an image on the sheet, comprising:

a housing having a transferring function;

mounting means in the housing for mounting the transfer member in the position where the color agent can be transferred to the sheet in accordance with the pattern; and holding means including a holding unit independent of said housing for holding the spare transfer members, said holding means including:

(i) a rotatable rack having plural radially-extending holders each for holding a respective one of said spare transfer members so that upon rotation of said rack, a predetermined one of said holders is rotatably indexed laterally relative to said mounting means in said housing; and (ii) shifting means for moving a spare transfer member held by said predetermined one of said holders between said mounting means and said predetermined one of said holders whereby said transfer member may be replaced by one of said spare transfer members.

5. An apparatus according to claim 1, wherein said holder can slide toward the outside of the housing along the direction in which the transfer members are attached to the mounting means, whereby the transfer members held by the holder are replaced by being rotated together with the holder through approximately 180 degrees after being moved to the outside of the housing.

6. An apparatus according to claim 5, wherein said holder has a first supporting portion for supporting half or more of the longitudinal dimension of each said transfer member to be attached to the mounting means.

7. An apparatus according to claim 1, wherein said mounting means includes detecting means for detecting the type of the transfer member to be attached thereto.

8. An apparatus according to claim 7, wherein said detecting means includes display means for indicating the detected type of the transfer member.

9. An apparatus according to claim 8, wherein said detecting means includes a switch member having a plurality of on-off switches, and said transfer member has thereon projections for individually depressing the on-off switches.

10. An apparatus according to claim 9, wherein said switch member includes three of said on-off switches, whereby the switch member detects eight types of transfer members through combinations of on and off states of the three on-off switches.

11. An apparatus according to claim 4 wherein said rotatable rack integrally includes plural retaining plates adapted to hold said plurality of spare transfer members.

12. An apparatus according to claim 11 wherein said holder has four said retaining plates arranged at regular intervals.

13. An apparatus according to claim 12 wherein said holding unit is located adjacent to the mounting means, and said rotatable rack includes drive means for stopping the rack at a position wherein one of the spare transfer members held by the retaining plates is substantially aligned with the mounting means.

14. An apparatus according to claim 13, wherein said shifting means includes a feed member adapted to engage and push the spare transfer member, thereby moving the spare transfer member toward the mounting means, and a guide rail for rectilinearly reciprocally guiding the feed member.

15. An apparatus according to claim 13, wherein said transfer member and each said spare transfer member are each provided with an engaging member adapted to engage the feed member, whereby the transfer member mounted on the mounting means can be moved to a vacant one of said retaining plates of the holding unit.

* * * * *